(12) United States Patent
Han et al.

(10) Patent No.: US 11,528,133 B2
(45) Date of Patent: Dec. 13, 2022

(54) QUANTUM SIGNATURE METHOD AND QUANTUM SECRET SHARING METHOD USING QUANTUM TRAPDOOR ONE-WAY FUNCTION

(71) Applicant: KOREA INSTITUTE OF SCIENCE AND TECHNOLOGY, Seoul (KR)

(72) Inventors: Sang Wook Han, Seoul (KR); Sung Wook Moon, Seoul (KR); Yong Su Kim, Seoul (KR); Sang Yun Lee, Seoul (KR); Young Wook Cho, Seoul (KR); Min Sung Kang, Seoul (KR); Ji Woong Choi, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 474 days.

(21) Appl. No.: 16/739,526

(22) Filed: Jan. 10, 2020

(65) Prior Publication Data

US 2020/0287714 A1    Sep. 10, 2020

(30) Foreign Application Priority Data

Mar. 6, 2019    (KR) .......................... 10-2019-0025896

(51) Int. Cl.
*H04L 9/08*    (2006.01)
(52) U.S. Cl.
CPC .......... *H04L 9/0852* (2013.01); *H04L 9/0825* (2013.01); *H04L 9/0861* (2013.01)

(58) Field of Classification Search
CPC ... H04L 9/0825; H04L 9/0852; H04L 9/0861; H04L 9/3247
See application file for complete search history.

(56) References Cited

U.S. PATENT DOCUMENTS

| | | | |
|---|---|---|---|
| 2017/0359172 A1* | 12/2017 | Chen | H04L 9/0891 |
| 2019/0327095 A1* | 10/2019 | Hong | H04L 9/0643 |
| 2020/0252457 A1* | 8/2020 | Zakrzewski | H04L 9/3213 |

FOREIGN PATENT DOCUMENTS

| | | |
|---|---|---|
| KR | 10-1374594 B1 | 3/2014 |
| KR | 10-2018-0135780 A | 12/2018 |

OTHER PUBLICATIONS

Georgios M. Nikolopoulos, "Applications of single-qubit rotations in quantum public-key cryptography", Physical Review A 77.3, Nov. 2, 2018, pp. 1-8.

(Continued)

*Primary Examiner* — Olugbenga O Idowu
(74) *Attorney, Agent, or Firm* — Rabin & Berdo, P.C.

(57) ABSTRACT

This specification discloses a quantum public-key cryptosystem. The quantum public-key cryptosystem may use two rotation operators $R_{\hat{n}}(\theta)$ and $R_{\hat{m}}(\varphi)$ satisfying a cyclic evolution. The two rotation operators $R_{\hat{n}}(\theta)$ and $R_{\hat{m}}(\varphi)$ do not have a commutation relation or an anti-commutation relation with each other. The commutation relation or the anti-commutation relation is established when either of the following conditions is satisfied: $\theta=2i\pi$, $\varphi=2j\pi$, or $\hat{n}\cdot\hat{m}=1$ (i, j=integer), and $\theta=(2k+1)\pi$, $\varphi=(2l+1)\pi$, or $\hat{n}\cdot\hat{m}=0$ (k, l=integer).

6 Claims, 15 Drawing Sheets

(56) References Cited

OTHER PUBLICATIONS

Korean Office Action dated Jul. 8, 2020.
C. H. Bennett et al., "Quantum Cryptography: Public Key Distribution and Coin Tossing", IEEE International Conference an Computers, Systems and Signal Processing, vol. 175, No. 1, pp. 175-179, Dec. 10-12, 1984.
Georgios M. Nikolopoulos, "Applications of single-qubit rotations in quantum public-key cryptography", Physical Review A, vol. 77, Mar. 28, 2008, pp. 032348-1 ~ 032348-7.
Hachiro Fujita, "Quantum Mceliece Public-Key Cryptosystem", Quantum Information and Computation, vol. 12, No. 3&4 (2012), pp. 181-202.

\* cited by examiner n axis n axis $$R_{\hat{n}}(\theta)R_{\hat{m}}(\phi) = R_{\hat{m}}(\phi)R_{\hat{n}}(\theta)$$

$$R_n(\theta)R_m(\phi) = -R_m(\phi)R_n(\theta)$$

$|\psi\rangle \in \{|0\rangle, |1\rangle\}$ $|\psi\rangle \in \{|+\rangle, |-\rangle\}$ $|\psi\rangle \in \{|y+\rangle, |y-\rangle\}$

QUANTUM SIGNATURE METHOD AND QUANTUM SECRET SHARING METHOD USING QUANTUM TRAPDOOR ONE-WAY FUNCTION

CROSS-REFERENCE TO RELATED APPLICATION

This application claims priority to and the benefit of Korean Patent Application No. 2019-0025896, filed on Mar. 6, 2019, the disclosure of which is incorporated herein by reference in its entirety.

BACKGROUND

1. Field of the Invention

The present disclosure relates to a quantum public-key cryptosystem, a quantum signature method, and a method of sharing a quantum secret and more particularly, to a quantum public-key system employing a quantum trapdoor one-way function.

2. Discussion of Related Art

The security of modern cryptography is seriously threatened by development of a quantum computer. In particular, public key cryptography based on computational complexity, such as factoring and discrete logarithm, is easily analyzed by Shor's algorithm implemented by a quantum computer. As an alternative of such modern cryptography, quantum cryptography was proposed. Since quantum cryptography is based on basic principles, such as the no-cloning theorem, the uncertainty principle, and the irreversibility of quantum measurement, security is fundamentally ensured even in a quantum computing environment.

Quantum Key Distribution (QKD) is a representative quantum cryptography protocol. The QKD protocol enables communicators to share a secret key without meeting together in person. In terms of cryptology, the QKD protocol is symmetric key cryptography and provides only confidentiality among characteristics of a cryptography service, such as confidentiality, integrity, authentication, and non-repudiation. To overcome this limitation, an arbitrated quantum signature scheme, a quantum digital signature scheme, etc. were proposed. However, these protocols are also applications of the QKD protocol and thus cannot be fundamental solutions. Consequently, quantum public-key cryptosystem is required for quantum cryptography to provide confidentiality, integrity, authentication, and non-repudiation.

In order to implement a quantum public-key cryptosystem, it is necessary to develop a quantum trapdoor one-way function first.

SUMMARY OF THE INVENTION

The present disclosure is directed to providing a quantum public-key cryptosystem.

Objects of the present disclosure are not limited to the aforementioned object, and other objects which have not been mentioned will be clearly understood by those of ordinary skill in the art from the following descriptions.

According to an exemplary embodiment of the present disclosure, a quantum public-key cryptosystem uses two rotation operators $R_{\hat{n}}(\theta)$ and $R_{\hat{m}}(\varphi)$ satisfying a cyclic evolution.

$$R_{\hat{n}}(\theta) = \cos\left(\frac{\theta}{2}\right)I - i\sin\left(\frac{\theta}{2}\right)(n_x\sigma_x + n_y\sigma_y + n_z\sigma_z) \text{ and}$$

$$R_{\hat{m}}(\theta) = \cos\left(\frac{\varphi}{2}\right)I - i\sin\left(\frac{\varphi}{2}\right)(m_x\sigma_x + m_y\sigma_y + m_z\sigma_z)$$

where $\hat{n}=(n_x,n_y,n_z)$ and $\hat{m}=(m_x,m_y,m_z)$ are rotation axes, and
$\theta$ and $\varphi$ are rotation angles.

According to an exemplary embodiment of the present disclosure, the two rotation operators $R_{\hat{n}}(\theta)$ and $R_{\hat{m}}(\varphi)$ may satisfy neither of the following conditions:

$\theta=2i\pi$, $\varphi=2j\pi$, or $\hat{n}\cdot\hat{m}=1$ ($i,j$=integer), and $\theta=(2k+1)\pi$, $\varphi=(2l+1)\pi$, or $\hat{n}\cdot\hat{m}=0$ ($k,l$=integer).

According to an exemplary embodiment of the present disclosure, the quantum public-key cryptosystem may include: a unitary transformation $\mathfrak{R}$ configured to encrypt a message in a quantum state $|\psi\rangle$ and trapdoor information T configured to decrypt an encrypted quantum state $|\psi'\rangle$. The unitary transformation $\mathfrak{R}$ may equal $R_{\hat{m}}^{\dagger}(\varphi)R_{\hat{n}}(\theta)R_{\hat{m}}(\varphi)$, and the trapdoor information T may equal $R_{\hat{n}}^{\dagger}(\theta)$.

According to an exemplary embodiment of the present disclosure, a quantum signature method includes: (a) generating, by a transmitter, a quantum message $|M\rangle$; (b) generating, by the transmitter, a private key and a public key by using two rotation operators $R_{\hat{n}}(\theta)$ and $R_{\hat{m}}(\varphi)$ satisfying a cyclic evolution; (c) generating, by the transmitter, a quantum signature $|S\rangle$ by applying the rotation operators $R_{\hat{n}}(\theta)$ and $R_{\hat{m}}(\varphi)$; and (d) transmitting, by the transmitter, a quantum signature pair $|M\rangle \otimes |S\rangle$ including the quantum message $|M\rangle$ and the quantum signature $|S\rangle$ to a receiver.

According to an exemplary embodiment of the present disclosure, operation (b) may include: (b-1) generating, by the transmitter, an arbitrary quantum state $|\psi\rangle$ and generating a private key $R_{\hat{n}}(\theta)$ satisfying $|M\rangle = R_{\hat{n}}(\theta)|\psi\rangle$; and (b-2) generating, by the transmitter, a public key $R_{\hat{m}}(\varphi)$ satisfying a cyclic evolution.

According to an exemplary embodiment of the present disclosure, operation (b) may further include (b-3) transmitting, by the transmitter, the public key $R_{\hat{m}}(\varphi)$ through a public channel.

According to an exemplary embodiment of the present disclosure, the quantum signature $|S\rangle$ may be an equation below:

$$|S\rangle = R_{\hat{n}}(\theta)R_{\hat{m}}(\varphi)|\psi\rangle,$$

According to an exemplary embodiment of the present disclosure, the quantum signature method may further include (e) verifying, by the receiver, the quantum signature $|S\rangle$ by applying a public key $R_{\hat{m}}^{\dagger}(\varphi)$ to the quantum signature pair $|M\rangle \otimes |S\rangle$ received from the transmitter as shown in an equation below:

$$|\langle M|R_{\hat{m}}^{\dagger}(\varphi)|S\rangle| = |\langle \psi|R_{\hat{n}}^{\dagger}(\theta)R_{\hat{m}}^{\dagger}(\varphi)R_{\hat{n}}(\theta)R_{\hat{m}}(\varphi)|\psi\rangle| = |\langle \psi|e^{i\epsilon}|\psi\rangle| = |e^{i\epsilon}||\langle \psi|\psi\rangle| = 1$$

According to an exemplary embodiment of the present disclosure, a method of sharing a quantum secret includes: (a) generating, by a secret generator, a quantum secret $|S\rangle$; (b) generating, by the secret generator, an encryption key and a decryption key by using two rotation operators $R_{\hat{n}}(\theta)$ and $R_{\hat{m}}(\varphi)$ satisfying a cyclic evolution; (c) generating, by the secret generator, an encrypted quantum secret $|S'\rangle$ from the quantum secret by using the encryption key; (d) dividing, by the secret generator, the decryption key into N pieces and transmitting the N pieces of decryption key to a plurality of secret receivers; and (e) transmitting, by the secret generator, the encrypted quantum secret |S'⟩ to a secret verifier.

According to an exemplary embodiment of the present disclosure, the encryption key may be $R_{\hat{m}}^{\dagger}(\varphi)R_{\hat{n}}(\theta)R_{\hat{m}}(\varphi)$, the decryption key may be $R_{\hat{n}}^{\dagger}(\theta)$, and the encrypted quantum secret may be $|S'\rangle = R_{\hat{m}}^{\dagger}(\varphi)R_{\hat{n}}(\theta)R_{\hat{m}}(\varphi)|S\rangle$.

Other details of the present disclosure are included in the detailed description and drawings.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
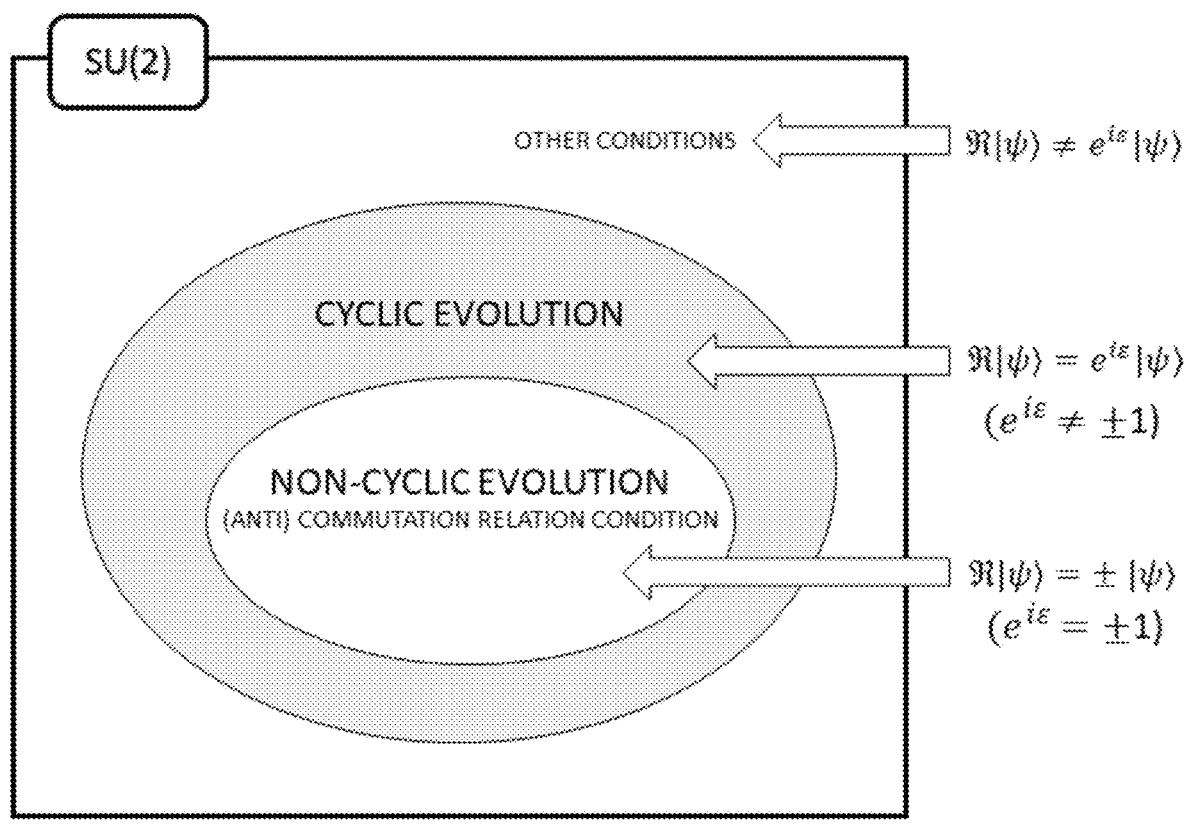
FIG. 1 is a conceptual diagram schematically showing a cyclic evolution under a non-(anti-)commutation relation condition and a non-cyclic evolution under a (anti) commutation relation condition in the Special Unitary Group of Degree 2 (SU(2))

Advantages and features of the present disclosure and methods for achieving them will be made clear from embodiments described below with reference to the accompanying drawings. However, the present disclosure may be embodied in many different forms and should not be construed as being limited to the embodiments set forth herein. Rather, these embodiments are provided so that this disclosure will be thorough and complete and will fully convey the scope of the present disclosure to those of ordinary skill in the technical field to which the present disclosure pertains. The present disclosure is only defined by the claims.

This specification discloses a quantum signature method and a quantum secret sharing method employing a quantum trapdoor one-way function. A quantum trapdoor one-way function uses a cyclic evolution of an arbitrary quantum state and uses a condition under which such a cyclic evolution occurs as trapdoor information. The trapdoor information of a quantum trapdoor one-way function may be used as a public key of a quantum public-key system, and in this way, the trapdoor information may be used in a quantum signature method and a quantum secret sharing method. In this specification, it will be disclosed that that a quantum trapdoor one-way function may be designed by using a cyclic evolution of an arbitrary quantum state, and a quantum signature method and a quantum secret sharing method, which are application techniques of a quantum public-key cryptosystem based on the fact, will be described.

As for a trapdoor one-way function, like a one-way function, it is easy to calculate an output y when an input x is given. In reverse, however, when the output y is given, it is difficult to calculate the input x. Only when special information referred to as a trapdoor is given, it is possible to easily calculate the input x. It is known that a quantum trapdoor one-way function having the same function as the trapdoor one-way function does not exist substantially in quantum cryptography. However, this specification will disclose that it is possible to design a quantum trapdoor one-way function by using a cyclic evolution of an arbitrary quantum state.

In quantum mechanics, a cyclic evolution refers to a case in which an arbitrary quantum state undergoes a unitary transformation and returns to itself not via the same route. Due to such a cyclic evolution, a global phase $e^{i\varepsilon}$ of an arbitrary quantum state $$|\psi\rangle = \cos\left(\frac{\alpha}{2}\right)|0\rangle + e^{i\beta}\sin\left(\frac{\alpha}{2}\right)|1\rangle$$

is obtained as follows.

$$\mathfrak{R}|\psi\rangle = e^{i\varepsilon}|\psi\rangle \quad \text{[Equation 1]}$$

Here, $\mathfrak{R}$ is a unitary operator, and the global phase $e^{i\varepsilon}$ is not ±1. The cyclic evolution of Equation 1 is represented as Equation 2 and Equation 3 below by using two single qubit unitary operators.

$$R_{\hat{n}}(\theta) = \cos\left(\frac{\theta}{2}\right)I - i\sin\left(\frac{\theta}{2}\right)(n_x\sigma_x + n_y\sigma_y + n_z\sigma_z) \quad \text{[Equation 2]}$$

$$R_{\hat{m}}(\theta) = \cos\left(\frac{\varphi}{2}\right)I - i\sin\left(\frac{\varphi}{2}\right)(m_x\sigma_x + m_y\sigma_y + m_z\sigma_z) \quad \text{[Equation 3]}$$

Four evolutions may be represented as Equation 4 below by using Equation 2 and Equation 3.

$$R_{\hat{n}}^{\dagger}(\theta)R_{\hat{m}}^{\dagger}(\varphi)R_{\hat{n}}(\theta)R_{\hat{m}}(\varphi)|\psi\rangle = e^{i\varepsilon}|\psi\rangle \quad \text{[Equation 4]}$$

Here, $\hat{n}=(n_x,n_y,n_z)$ and $\hat{m}=(m_x,m_y,m_z)$ are rotation axes, and θ and φ are rotation angles.

$R_{\hat{n}}(\theta)$ of Equation 2 and $R_{\hat{m}}(\varphi)$ of Equation 3 are not in a commutation relation or an anti-commutation relation so that Equation 4 may become a cyclic evolution. A condition under which $R_{\hat{n}}(\theta)$ and $R_{\hat{m}}(\varphi)$ have a commutation relation $[R_{\hat{n}}(\theta),R_{\hat{m}}(\varphi)]=R_{\hat{n}}(\theta)R_{\hat{m}}(\varphi)-R_{\hat{m}}(\varphi)R_{\hat{n}}(\theta)=0$ or an anti-commutation relation $[R_{\hat{n}}(\theta),R_{\hat{m}}(\varphi)]=R_{\hat{n}}(\theta)R_{\hat{m}}(\varphi)-R_{\hat{m}}(\varphi)R_{\hat{n}}(\theta)=0$ is shown in Equation 5 or Equation 6 below.

$$\theta=2i\pi,\ \varphi=2j\pi,\ \text{or}\ \hat{n}\cdot\hat{m}=1\ (i,j=\text{integer}) \quad \text{[Equation 5]}$$

$$\theta=(2k+1)\pi,\ \varphi=(2l+1)\pi,\ \text{or}\ \hat{n}\cdot\hat{m}=0\ (k,l=\text{integer}) \quad \text{[Equation 6]}$$

When $\hat{n}\cdot\hat{m}=1$ is satisfied, $\hat{n}=(n_x,n_y,n_z)$ and $\hat{m}=(m_x,m_y,m_z)$ are equal to each other. When $\hat{n}\cdot\hat{m}=0$ is satisfied, $\hat{n}=(n_x,n_y,n_z)$ and $\hat{m}=(m_x,m_y,m_z)$ are orthogonal to each other.

When $R_{\hat{n}}(\theta)$ and $R_{\hat{m}}(\varphi)$ satisfy the commutation relation of Equation 5 and the anti-commutation relation of Equation 6, a global phase $e^{i\alpha}$ in Equation 4 becomes ±1 as shown in Equation 7 below.

$$R_{\hat{n}}^\dagger(\theta)R_{\hat{m}}^\dagger(\varphi)R_{\hat{n}}(\theta)R_{\hat{m}}(\varphi)|\psi\rangle = \pm R_{\hat{n}}^\dagger(\theta)R_{\hat{n}}(\theta)R_{\hat{m}}^\dagger(\varphi)R_{\hat{m}}(\varphi)|\psi\rangle = \pm 1|\psi\rangle \quad \text{[Equation 7]}$$

FIG. 1 is a conceptual diagram schematically showing a cyclic evolution under a non-(anti) commutation relation condition and a non-cyclic evolution under a (anti) commutation relation condition in the Special Unitary Group of Degree 2 (SU(2)).

Figure 2:
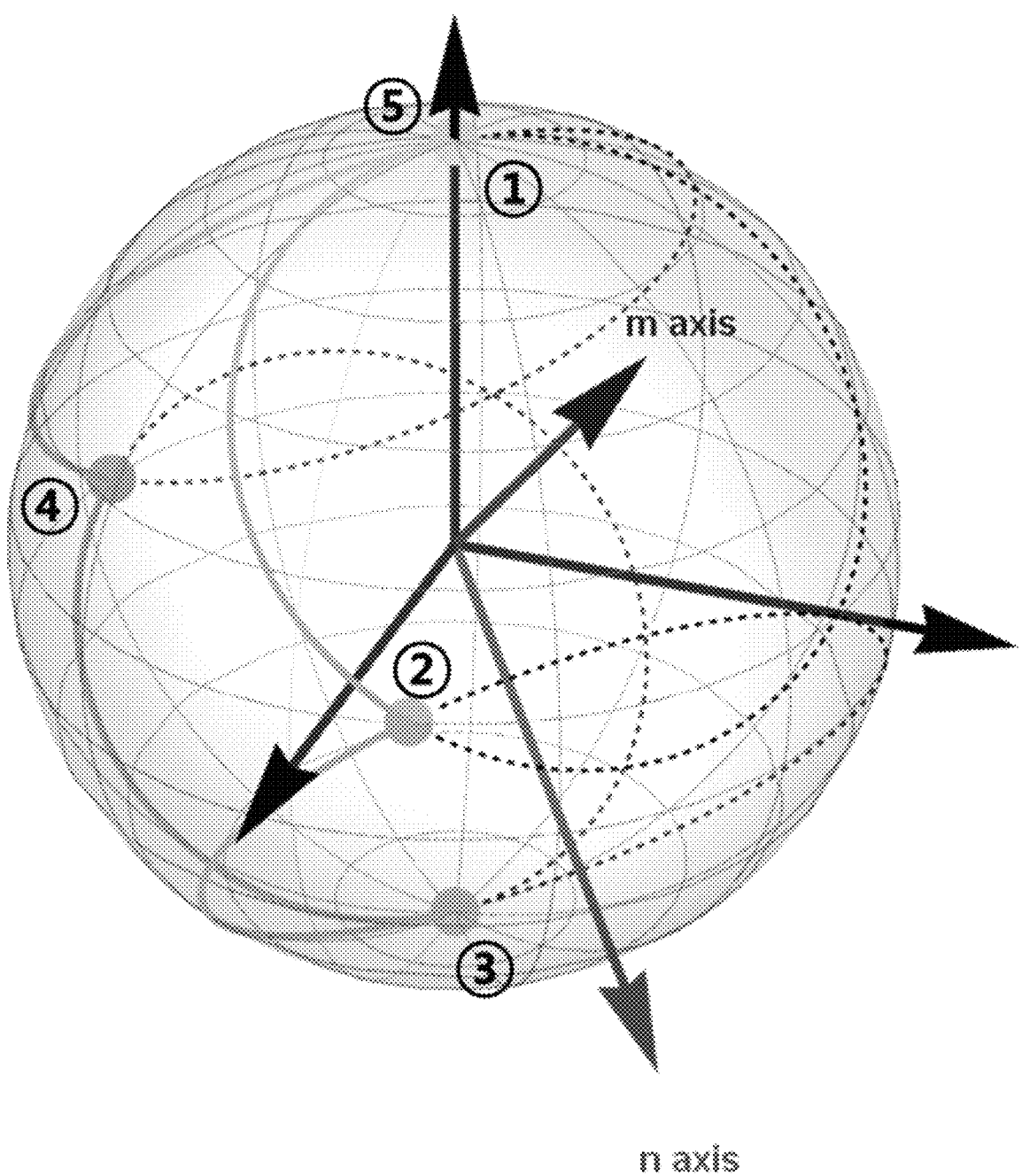
FIG. 2 is an exemplary diagram showing a cyclic evolution of an arbitrary quantum state |ψ⟩ realized by rotation operators $R_{\hat{n}}(\theta)$ and $R_{\hat{m}}(\varphi)$ on the Bloch sphere.

FIG. 2 is an exemplary diagram showing a cyclic evolution of an arbitrary quantum state $|\psi\rangle$ realized by rotation operators $R_{\hat{n}}(\theta)$ and $R_{\hat{m}}(\varphi)$ on the Bloch sphere.

Referring to FIG. 2, the arbitrary quantum state $|\psi\rangle$ initially starts at a location ① and moves to locations ②, ③, ④, and ⑤ in sequence. It is possible to see that the final location ⑤ is identical to the initial location ①.

FIGS. 3 to 6 are exemplary diagrams separately showing cyclic evolutions of the arbitrary quantum state $|\psi\rangle$ realized by the rotation operators $R_{\hat{n}}(\theta)$ and $R_{\hat{m}}(\varphi)$, which satisfy a non-commutation relation condition or a non-anti-commutation relation condition, on the Bloch sphere.

Figure 3:
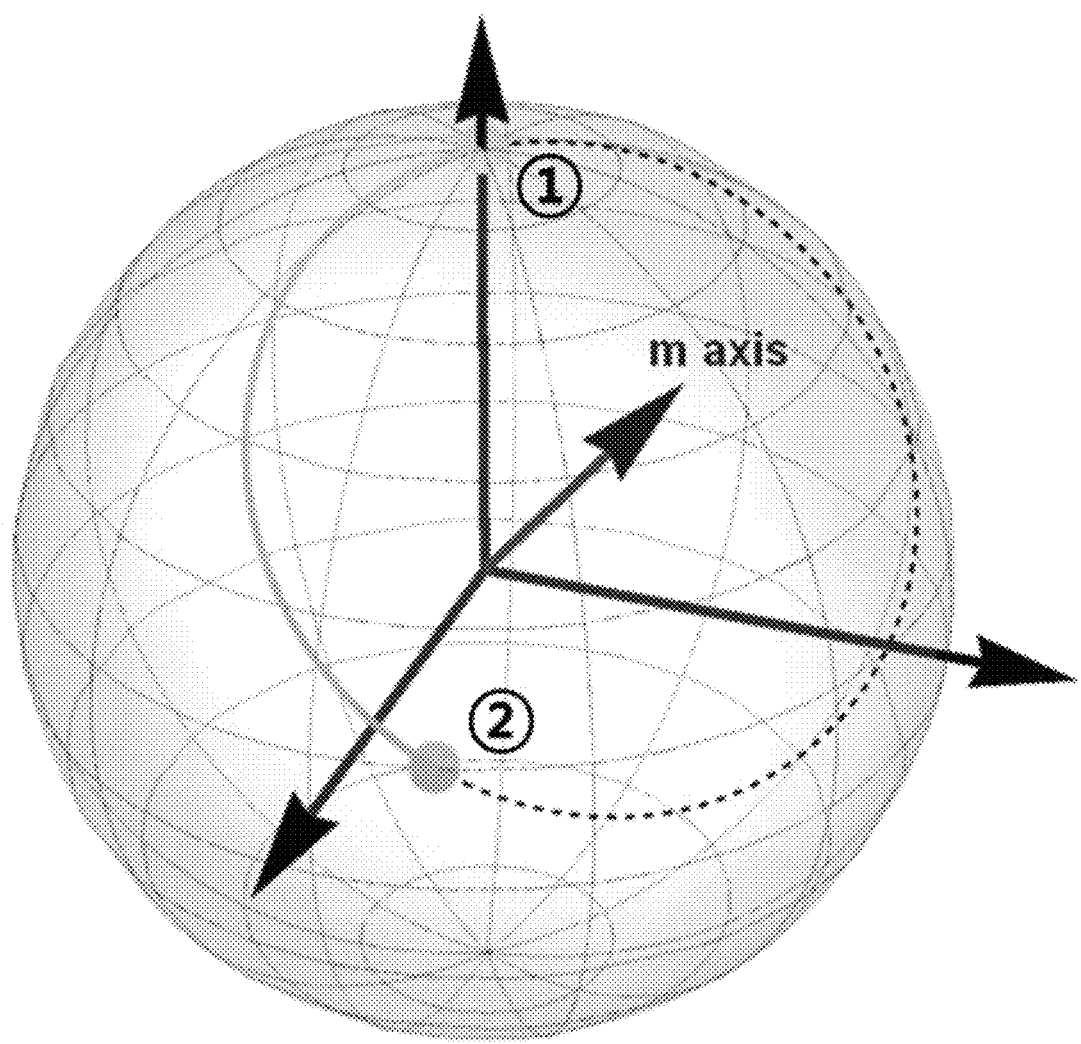
FIGS. 3 to 6 are exemplary diagrams separately showing cyclic evolutions of an arbitrary quantum state |ψ⟩ realized by rotation operators $R_{\hat{n}}(\theta)$ and $R_{\hat{m}}(\varphi)$, which satisfy a non-commutation relation condition or a non-anti-commutation relation condition, on the Bloch sphere.

Referring to FIG. 3, the arbitrary quantum state $|\psi\rangle$ rotates counterclockwise from the initial location ① to the location ② by the rotation operator $R_{\hat{m}}(\varphi)$.

Figure 4:
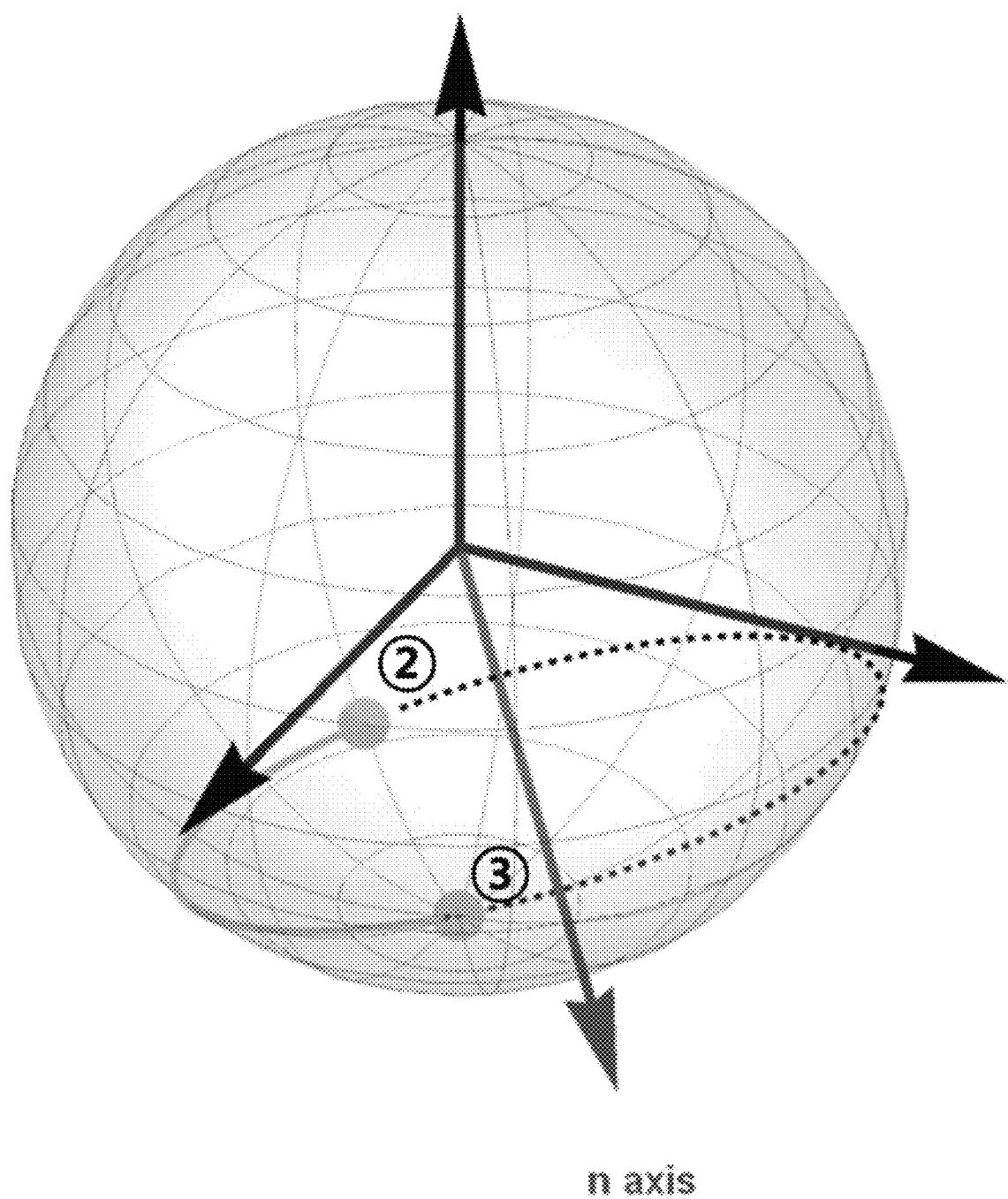

Referring to FIG. 4, the quantum state at the location ② rotates counterclockwise to the location ③ by the rotation operator $R_{\hat{n}}(\theta)$.

Figure 5:
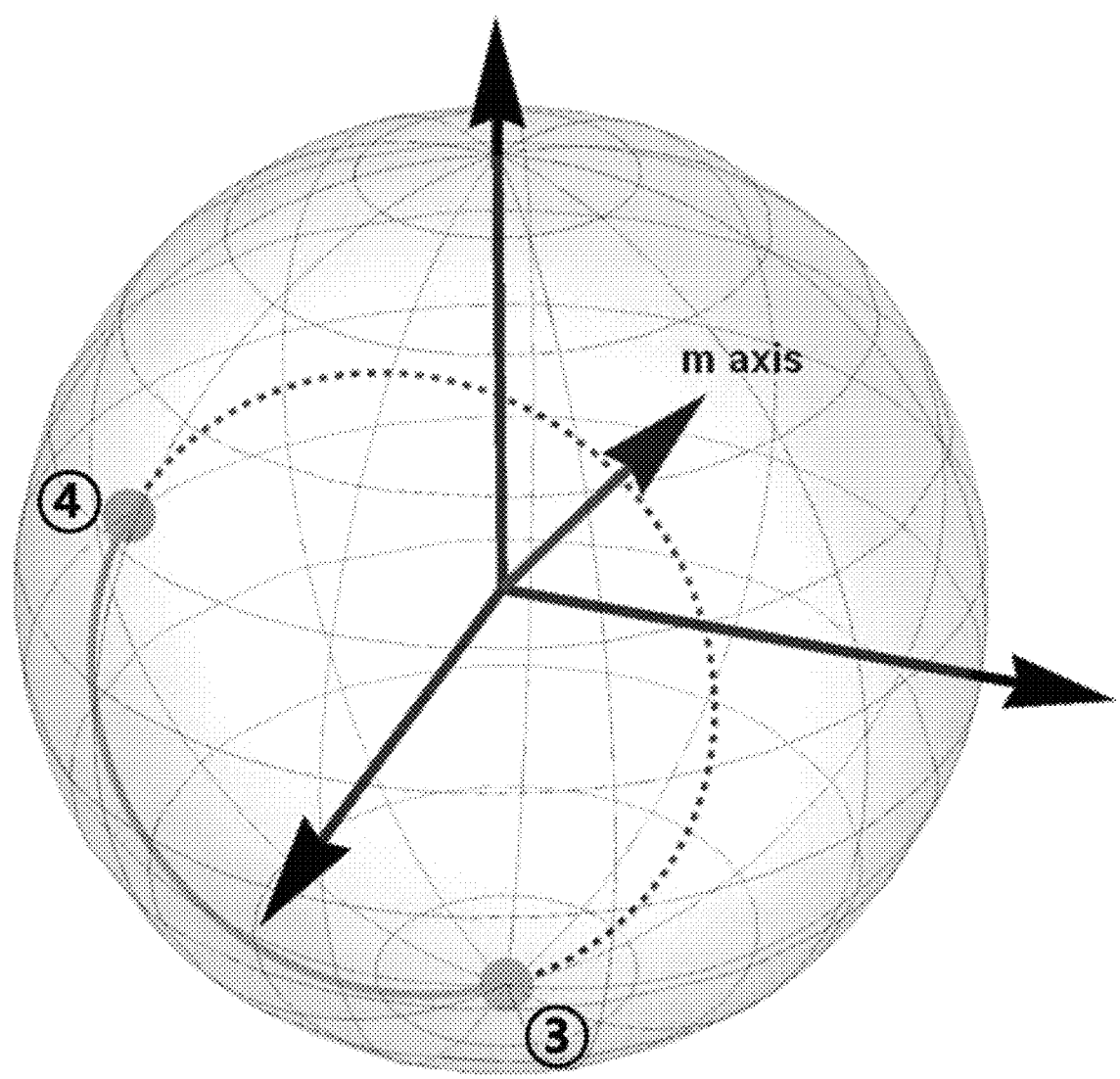

Referring to FIG. 5, the quantum state at the location ③ rotates to the location ④ by a rotation operator $R_{\hat{m}}^\dagger(\varphi)$. The rotation operator $R_{\hat{m}}^\dagger(\varphi)$ is an inverse rotation operator of the rotation operator $R_{\hat{m}}(\varphi)$ and rotates clockwise about the same rotation axis.

Figure 6:
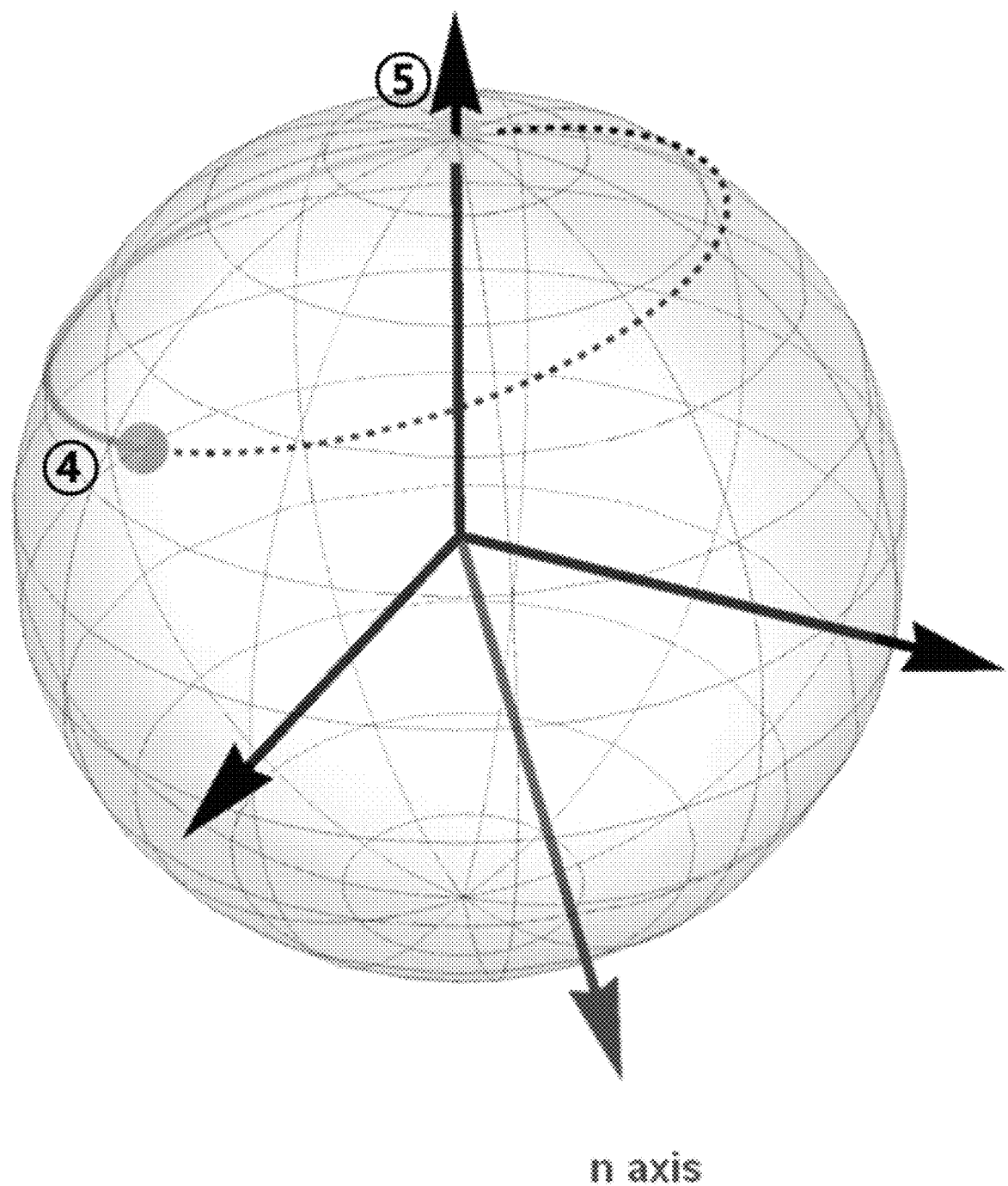

Referring to FIG. 6, the quantum state at the location ④ rotates to the location ⑤ by a rotation operator $R_{\hat{n}}^\dagger(\theta)$. The rotation operator $R_{\hat{n}}^\dagger(\theta)$ is an inverse rotation operator of the rotation operator $R_{\hat{n}}(\theta)$ and rotates clockwise about the same rotation axis.

FIGS. 3 to 6 show an example in which an arbitrary quantum state rotates counterclockwise first and then inversely rotates clockwise. However, this is merely an example, and rotation directions are not limited to the example shown in the drawings.

Figure 7:
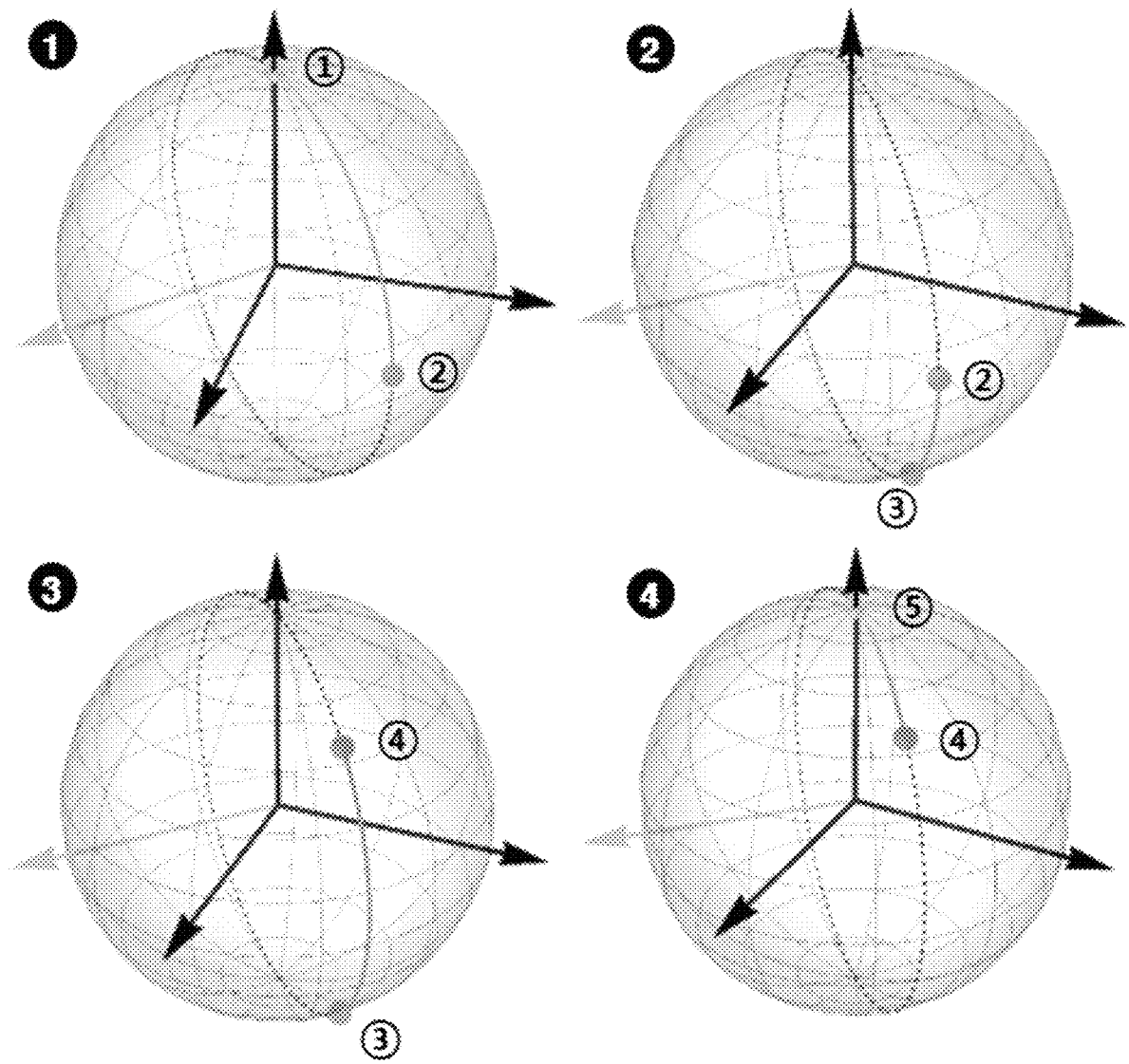
FIG. 7 is a set of exemplary diagrams showing non-cyclic evolutions of an arbitrary quantum state |ψ⟩ realized by rotation operators and $R_{\hat{n}}(\theta)$ and $R_{\hat{m}}(\varphi)$, which satisfy a commutation relation condition, on the Bloch sphere.

FIG. 7 is a set of exemplary diagrams showing non-cyclic evolutions of an arbitrary quantum state $|\psi\rangle$ realized by the rotation operators $R_{\hat{n}}(\theta)$ and $R_{\hat{m}}(\varphi)$, which satisfy a commutation relation condition, on the Bloch sphere.

Figure 8:
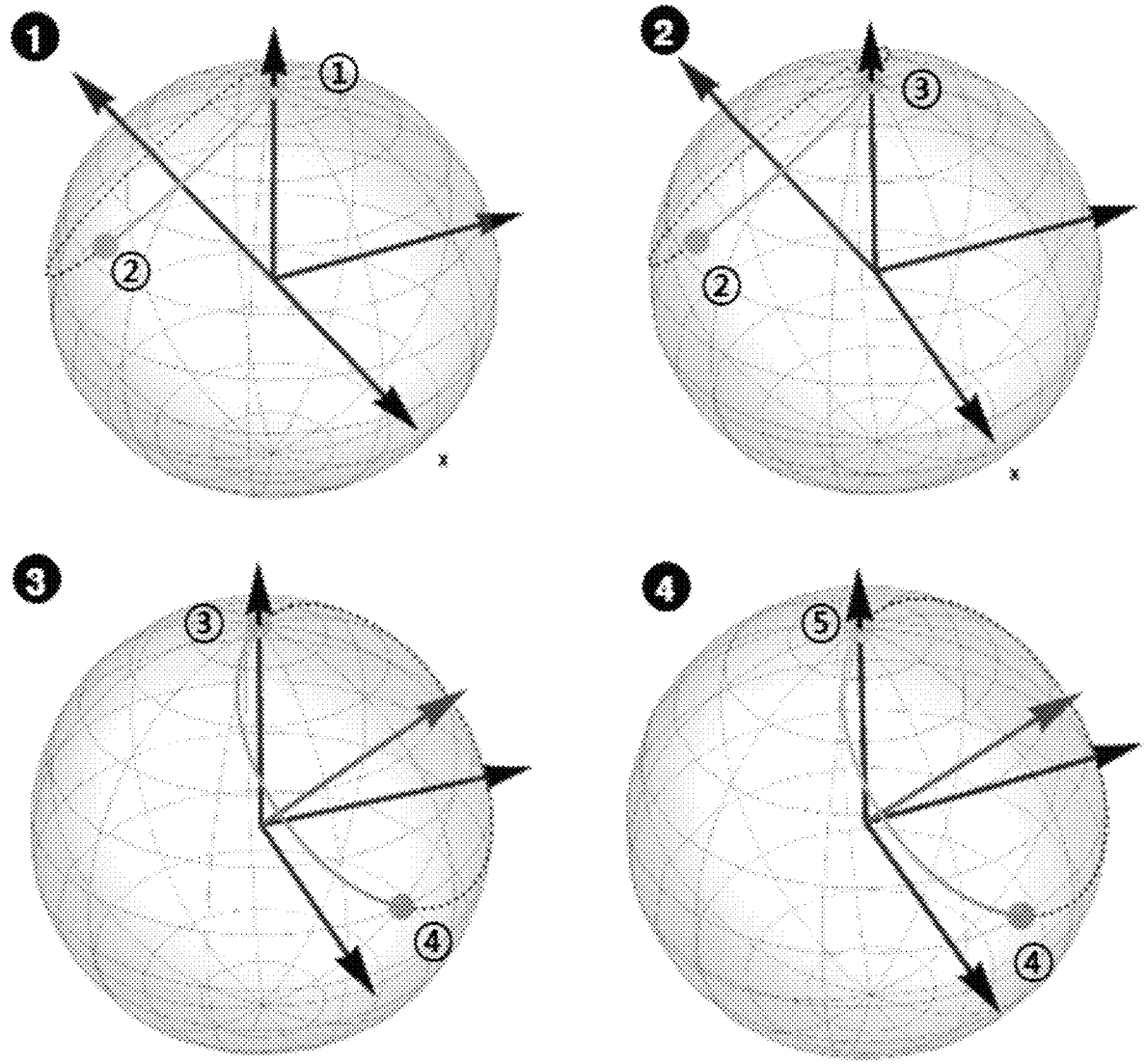
FIG. 8 is a set of exemplary diagrams showing non-cyclic evolutions of an arbitrary quantum state |ψ⟩ realized by rotation operators $R_{\hat{n}}(\theta)$ and $R_{\hat{m}}(\varphi)$, which satisfy an anti-commutation relation condition, on the Bloch sphere.

FIG. 8 is a set of exemplary diagrams showing non-cyclic evolutions of an arbitrary quantum state $|\psi\rangle$ realized by the rotation operators $R_{\hat{n}}(\theta)$ and $R_{\hat{m}}(\varphi)$, which satisfy an anti-commutation relation condition, on the Bloch sphere.

It is possible to see that the rotation operators $R_{\hat{n}}(\theta)$ and $R_{\hat{m}}(\varphi)$ shown in FIGS. 7 and 8 satisfy a commutation relation condition or an anti-commutation relation condition and thus the arbitrary quantum state $|\psi\rangle$ returns to its original location. Therefore, the rotation operators $R_{\hat{n}}(\theta)$ and $R_{\hat{m}}(\varphi)$ satisfying a commutation relation condition or an anti-commutation relation condition are not suitable for use in a quantum public-key cryptosystem.

Figure 9:
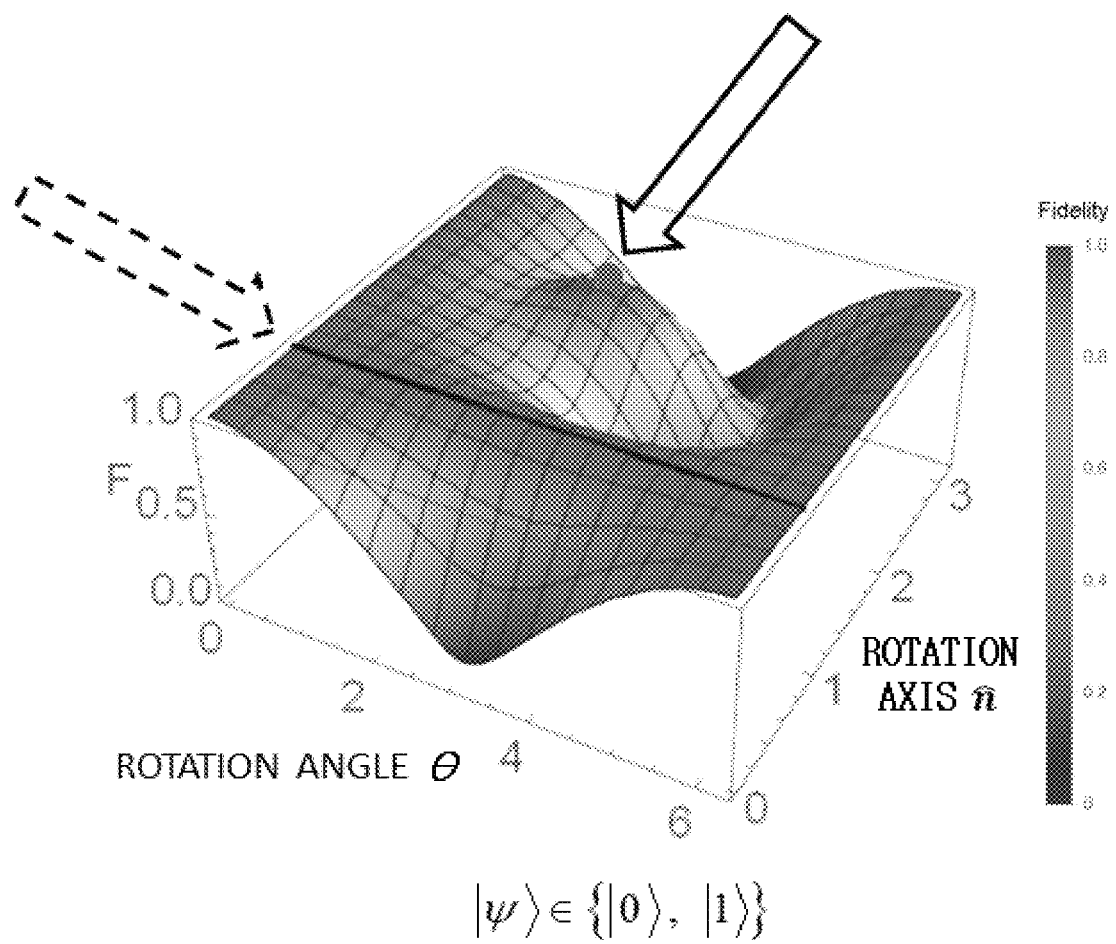
FIGS. 9 to 11 show an average Uhlmann's fidelity $|\langle\psi|R_{\hat{n}}^{\dagger}(\theta)R_{\hat{m}}^{\dagger}(\varphi)R_{\hat{n}}(\theta)R_{\hat{m}}(\varphi)|\psi\rangle|$ of $R_{\hat{n}}^{\dagger}(\theta)R_{\hat{m}}^{\dagger}(\varphi)R_{\hat{n}}(\theta)R_{\hat{m}}(\varphi)|\psi\rangle$ and $|\psi\rangle$.
Figure 10:
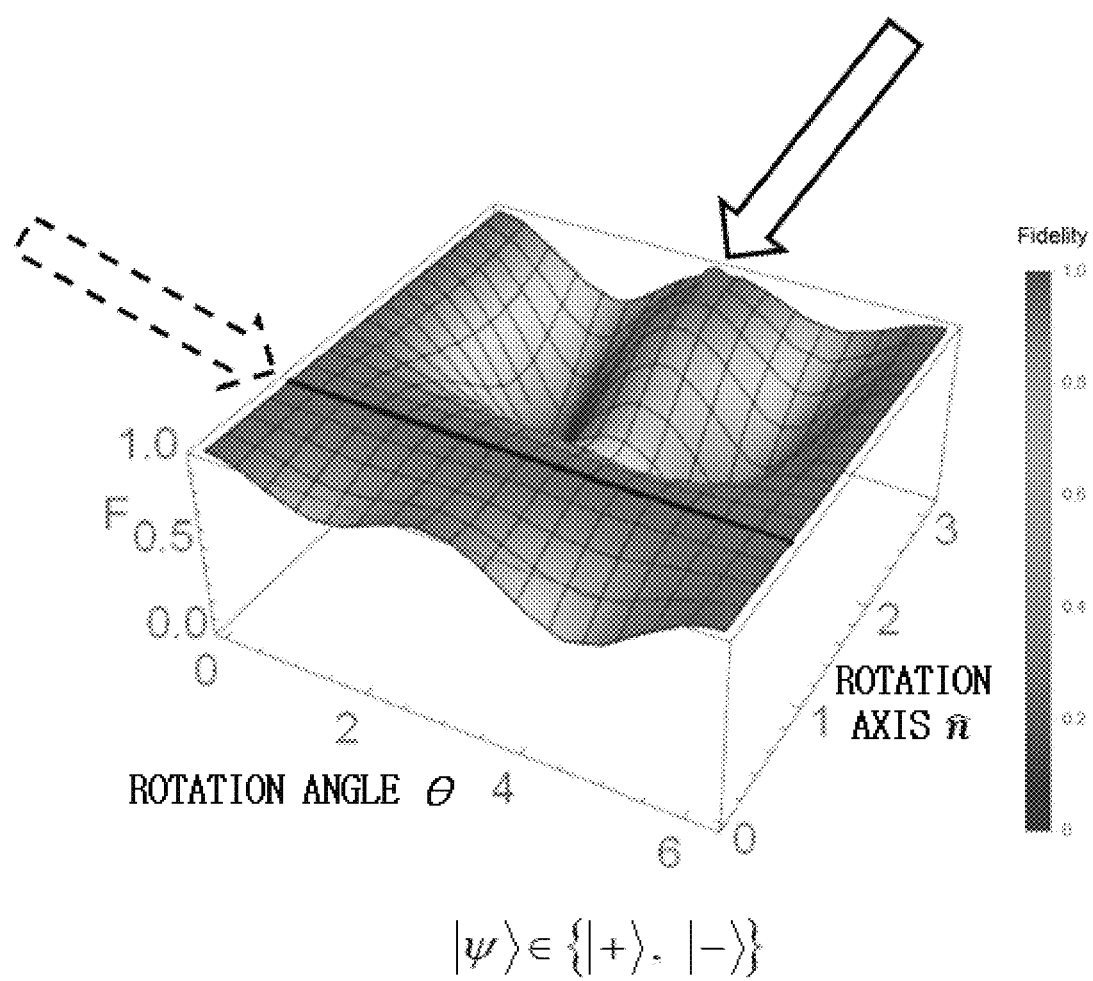
Figure 11:
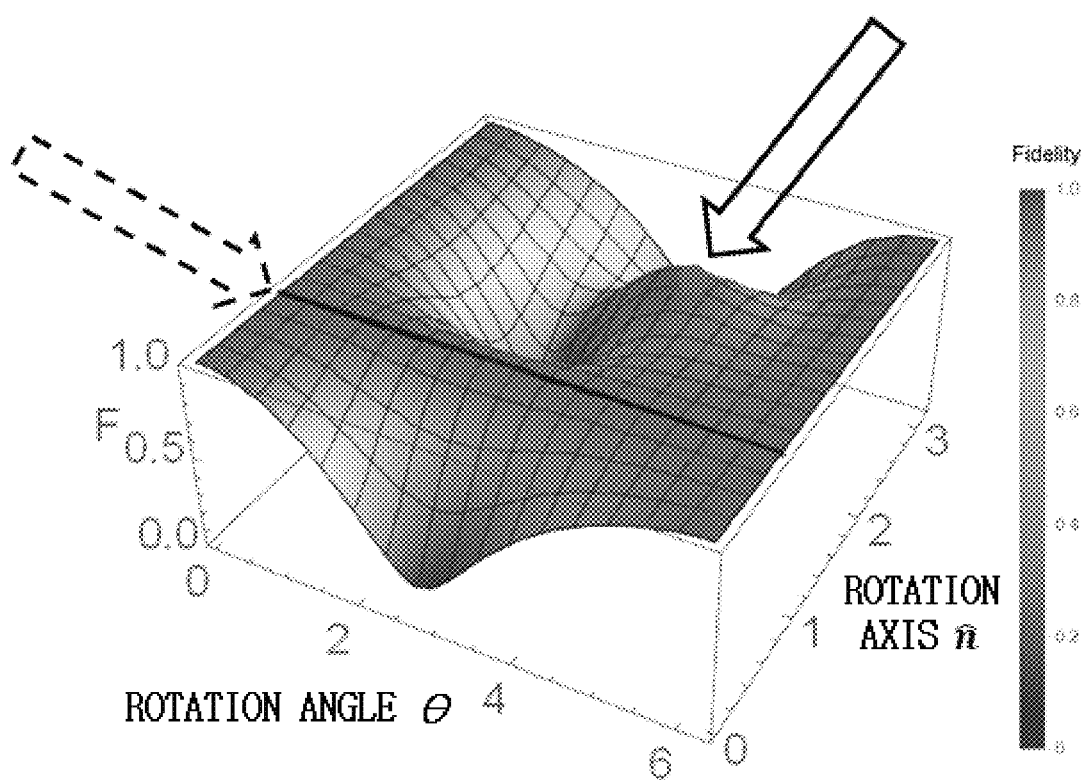

FIGS. 9 to 11 show an average Uhlmann's fidelity $|\langle\psi|R_{\hat{n}}^\dagger(\theta)R_{\hat{m}}^\dagger(\varphi)R_{\hat{n}}(\theta)R_{\hat{m}}(\varphi)|\psi\rangle|$ of $R_{\hat{n}}^\dagger(\theta)R_{\hat{m}}^\dagger(\varphi)R_{\hat{n}}(\theta)R_{\hat{m}}(\varphi)|\psi\rangle$ and $|\psi\rangle$.

In FIGS. 9 to 11, $R_{\hat{m}}(\varphi)$ is fixed, and a rotation axis $\hat{n}$ and a rotation angle $\theta$ of $R_{\hat{n}}(\theta)$ are changed. In FIGS. 9 to 11, $|\psi\rangle$ is $|z\pm\rangle$, $|x\pm\rangle$, and $|y\pm\rangle$, respectively.

Referring to FIGS. 9 to 11, a point at which a cyclic evolution occurs varies according to $|\psi\rangle$ as shown by a green point (a point indicated by a solid-line arrow). However, a point at which a non-cyclic evolution occurs is fixed as shown by a blue solid line (a line indicated by a broken-line arrow).

In this specification, the unitary transformation $\mathfrak{R}$ which transforms the arbitrary quantum state $|\psi\rangle$ into another quantum state $|\psi'\rangle$ is defined as a quantum trapdoor one-way function, and trapdoor information is defined as T. Details thereof are as follows:

Input state:

$$|\psi\rangle = \cos\left(\frac{\alpha}{2}\right)|0\rangle + e^{i\beta}\sin\left(\frac{\alpha}{2}\right)|1\rangle$$

Output state: $|\psi'\rangle = \mathfrak{R}|\psi\rangle$
Unitary transformation: $\mathfrak{R} = R_{\hat{m}}^\dagger(\varphi)R_{\hat{n}}(\theta)R_{\hat{m}}(\varphi)$, $[R_{\hat{n}}(\theta), R_{\hat{m}}(\varphi)] \neq 0$, $\{R_{\hat{n}}(\theta), R_{\hat{m}}(\varphi)\} \neq 0$
Trapdoor information: $T = R_{\hat{n}}^\dagger(\theta)$ The unitary transformation $\mathfrak{R}$ is a combination $R_{\hat{m}}^\dagger(\varphi)R_{\hat{n}}(\theta)R_{\hat{m}}(\varphi)$ of the rotation operators $R_{\hat{n}}(\theta)$ and $R_{\hat{m}}(\varphi)$. In this case, $R_{\hat{n}}(\theta)$ and $R_{\hat{m}}(\varphi)$ satisfy $[R_{\hat{n}}(\theta), R_{\hat{m}}(\varphi)] \neq 0$ and $\{R_{\hat{n}}(\theta), R_{\hat{m}}(\varphi)\} \neq 0$. When the output state $|\psi'\rangle = \mathfrak{R}|\psi\rangle$ is given, it is very difficult to obtain the input state $|\psi\rangle$ by inverse operation. In this case, it is possible to easily acquire the quantum state $e^{i\alpha}|\psi\rangle$ by applying the trapdoor information $T = R_{\hat{n}}^\dagger(\theta)$ to the output state $|\psi'\rangle = \mathfrak{R}|\psi\rangle$. This is represented by Equation 8 below.

$$T|\psi'\rangle = T\mathfrak{R}|\psi\rangle R_{\hat{n}}^\dagger(\theta)R_{\hat{m}}^\dagger(\varphi)R_{\hat{n}}(\theta)R_{\hat{m}}(\varphi)|\psi\rangle = e^{i\alpha}|\psi\rangle \quad \text{[Equation 8]}$$

$e^{i\alpha}|\psi\rangle$ of Equation 8 differs from the input state $|\psi\rangle$ only in the global phase $e^{i\alpha}$. When $e^{i\alpha}|\psi\rangle$ and $|\psi\rangle$ are input to a swap test, the result is given by Equation 9 below.

$$\tfrac{1}{2}\{|0\rangle_{ancilla}[e^{i\alpha}|\psi\rangle_1)|\psi\rangle_2 + |\psi\rangle_1(e^{i\alpha}|\psi\rangle_2)] + |1\rangle_{ancilla}[(e^{i\alpha}|\psi\rangle_1)|\psi\rangle_2 - |\psi\rangle_1(e^{i\alpha}|\psi\rangle_2)]\} \quad \text{[Equation 9]}$$

Since Equation 9 becomes Equation 10 given below, the measurement results of ancilla qubits become $|0\rangle_{ancilla}$ at all times.

$$|0\rangle_{ancilla}\left[\frac{1}{\sqrt{2}}(e^{i\alpha}|\psi\rangle_1)|\psi\rangle_2 + |\psi\rangle_1(e^{-i\alpha}|\psi\rangle_2)\right] \quad \text{[Equation 10]}$$

Consequently, it is determined in the swap test that the two quantum states $e^{i\alpha}|\psi\rangle$ and $|\psi\rangle$ are identical. It has been described above that the green point (indicated by a solid-line arrow) of FIGS. 9 to 11 represents a point at which an Uhlmann's fidelity $|\langle\psi|e^{i\alpha}|\psi\rangle|$ of the quantum states $e^{i\alpha}|\psi\rangle$ and $|\psi\rangle$ equals 1. Another important characteristic of a trapdoor one-way function is that it is not possible to know what kind of operation corresponds to a function only from trapdoor information. A point at which a cyclic evolution occurs varies according to $|\psi\rangle$ as shown by the green point (indicated by a solid-line arrow) of FIGS. 9 to 11. Therefore, although the trapdoor information $T = R_{\hat{n}}^\dagger(\theta)$ is acquired, it is not possible to know $R_{\hat{m}}(\varphi)$ when $|\psi\rangle$ is not acquired. Consequently, the quantum trapdoor one-way function according to this specification does not allow estimation of the unitary transformation $\Re = R_{\tilde{m}}^\dagger(\varphi) R_{\tilde{n}}(\theta) R_{\tilde{m}}(\varphi)$ only based on the trapdoor information $T = R_{\tilde{n}}^\dagger(\theta)$ like a trapdoor one-way function of current cryptography. Due to this characteristic of a quantum trapdoor one-way function, when the quantum trapdoor one-way function is applied to a cryptosystem, it is possible to ensure security and also provide various cryptography services.

A quantum signature method and a quantum secret sharing method of a quantum public-key cryptosystem employing a quantum trapdoor one-way function will be described below.

A quantum signature method will be described first. Communicators include a transmitter Alice and a receiver Bob.

Figure 12:
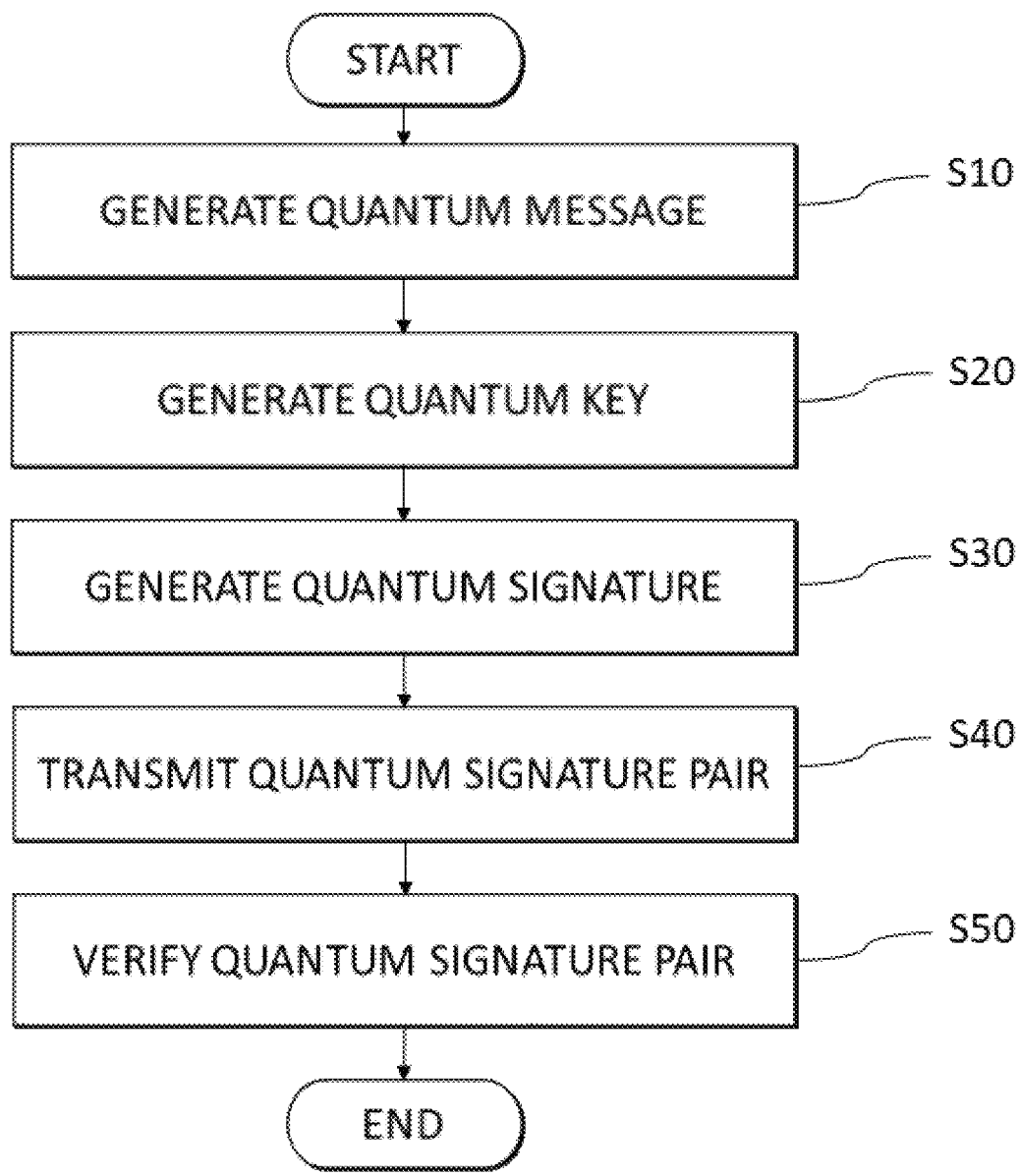
FIG. 12 is a flowchart of a quantum signature method according to an exemplary embodiment of the present disclosure.

FIG. 12 is a flowchart of a quantum signature method according to an exemplary embodiment of the present disclosure.

Figure 13:
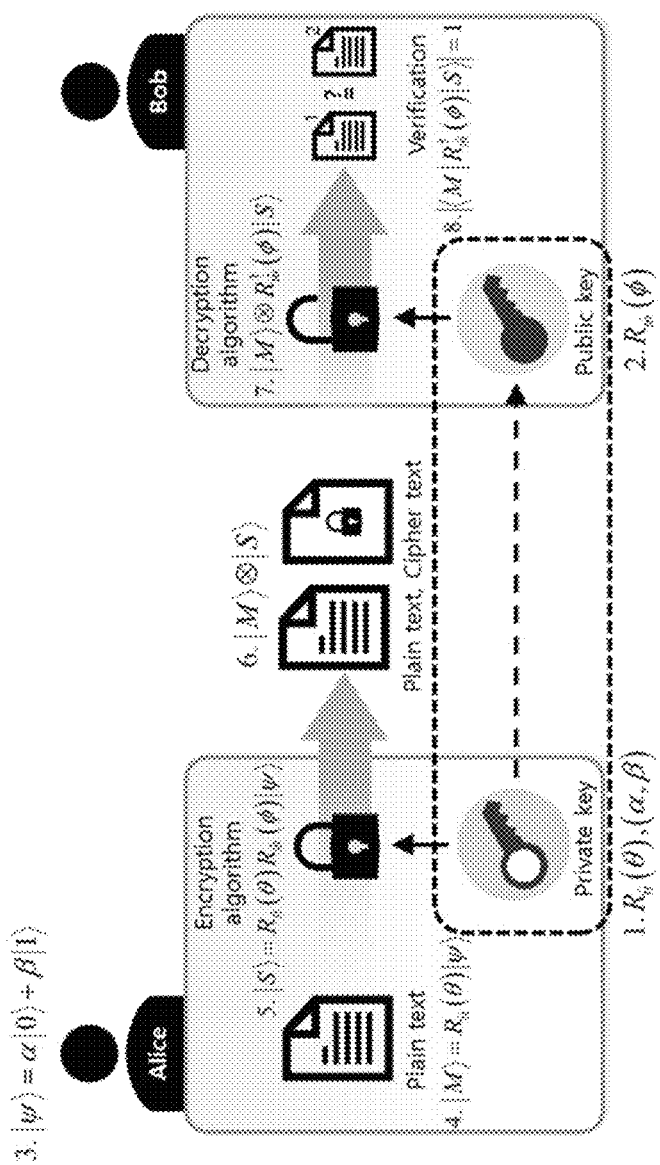
FIG. 13 is a conceptual diagram of a quantum signature method according to an exemplary embodiment of the present disclosure.

FIG. 13 is a conceptual diagram of a quantum signature method according to an exemplary embodiment of the present disclosure.

Referring to FIGS. 12 and 13, in a quantum signature method according to an exemplary embodiment of the present disclosure, the transmitter Alice generates a quantum message $|M\rangle$ corresponding to a message first (Operation S10).

Subsequently, the transmitter Alice may generate a private key and a public key using two rotation operators $R_{\tilde{n}}(\theta)$ and $R_{\tilde{m}}(\varphi)$ satisfying a cyclic evolution (Operation S20).

More specifically, the transmitter Alice generates an arbitrary quantum state $$|\psi\rangle = \cos\left(\frac{\alpha}{2}\right)|0\rangle + e^{i\beta}\sin\left(\frac{\alpha}{2}\right)|1\rangle$$

and generates a private key $R_{\tilde{n}}(\theta)$ satisfying $|M\rangle = R_{\tilde{n}}(\theta)|\psi\rangle$. Also, the transmitter Alice generates a public key $R_{\tilde{m}}(\varphi)$ satisfying a cyclic evolution such $R_{\tilde{n}}^\dagger(\theta) R_{\tilde{m}}^\dagger(\varphi) R_{\tilde{n}}(\theta) R_{\tilde{m}}(\varphi) |\psi\rangle = e^{i\alpha}|\psi\rangle$. Additionally, the transmitter Alice may transmit a generated public key $R_{\tilde{m}}^\dagger(\varphi)$ to the receiver Bob through a public channel.

Subsequently, the transmitter Alice may generate a quantum signature $|S\rangle = R_{\tilde{n}}(\theta) R_{\tilde{m}}(\varphi)|\psi\rangle$ by consecutively applying the operators $R_{\tilde{m}}(\varphi)$ and $R_{\tilde{n}}(\theta)$ to the arbitrary quantum state $|\psi\rangle$ (Operator S30).

Subsequently, the transmitter Alice may transmit a quantum signature pair $|M\rangle \otimes |S\rangle$ including the quantum message $|M\rangle$ corresponding to the message and the quantum signature $|S\rangle$ to the receiver Bob (Operation S40).

Subsequently, to verify the quantum signature pair $|M\rangle \otimes |S\rangle$ received from the transmitter Alice, the receiver Bob may apply the public key $R_{\tilde{m}}^\dagger(\varphi)$ to the quantum signature $|S\rangle$ as shown in Equation 11 below (Operation S50).

$$R_{\tilde{m}}^\dagger(\varphi)|S\rangle = R_{\tilde{m}}^\dagger(\varphi) R_{\tilde{n}}(\theta) R_{\tilde{m}}(\varphi)|\psi\rangle \quad \text{[Equation 11]}$$

More specifically, as shown in Equation 12 below, the receiver Bob may check an Uhlmann's fidelity $|\langle M|R_{\tilde{m}}^\dagger(\varphi)|S\rangle|$ with respect to $R_{\tilde{m}}^\dagger(\varphi)|S\rangle$ of FIG. 11 to which the quantum message $|M\rangle$ and the public key $R_{\tilde{m}}^\dagger(\varphi)$ are applied.

$$|\langle M|R_{\tilde{m}}^\dagger(\varphi)|S\rangle| = |\langle \psi|R_{\tilde{n}}^\dagger(\theta) R_{\tilde{m}}^\dagger(\varphi) R_{\tilde{n}}(\theta) R_{\tilde{m}}(\varphi)|\psi\rangle| = |\langle \psi|e^{i\varepsilon}|\psi\rangle| = |e^{i\varepsilon}||\langle \psi|\psi\rangle| = 1 \quad \text{[Equation 12]}$$

At this time, the receiver Bob accepts the quantum signature pair of the transmitter Alice when a value of the Uhlmann's fidelity $|\langle M|R_{\tilde{m}}^\dagger(\varphi)|S\rangle|$ is 1, and rejects the quantum signature otherwise. The Uhlmann's fidelity may be implemented through a swap test.

Next, a quantum secret sharing method will be described. Communicators include a secret generator Alice, a plurality of secret receivers Bob #1 to Bob #N, and a secret verifier Charlie.

Figure 14:
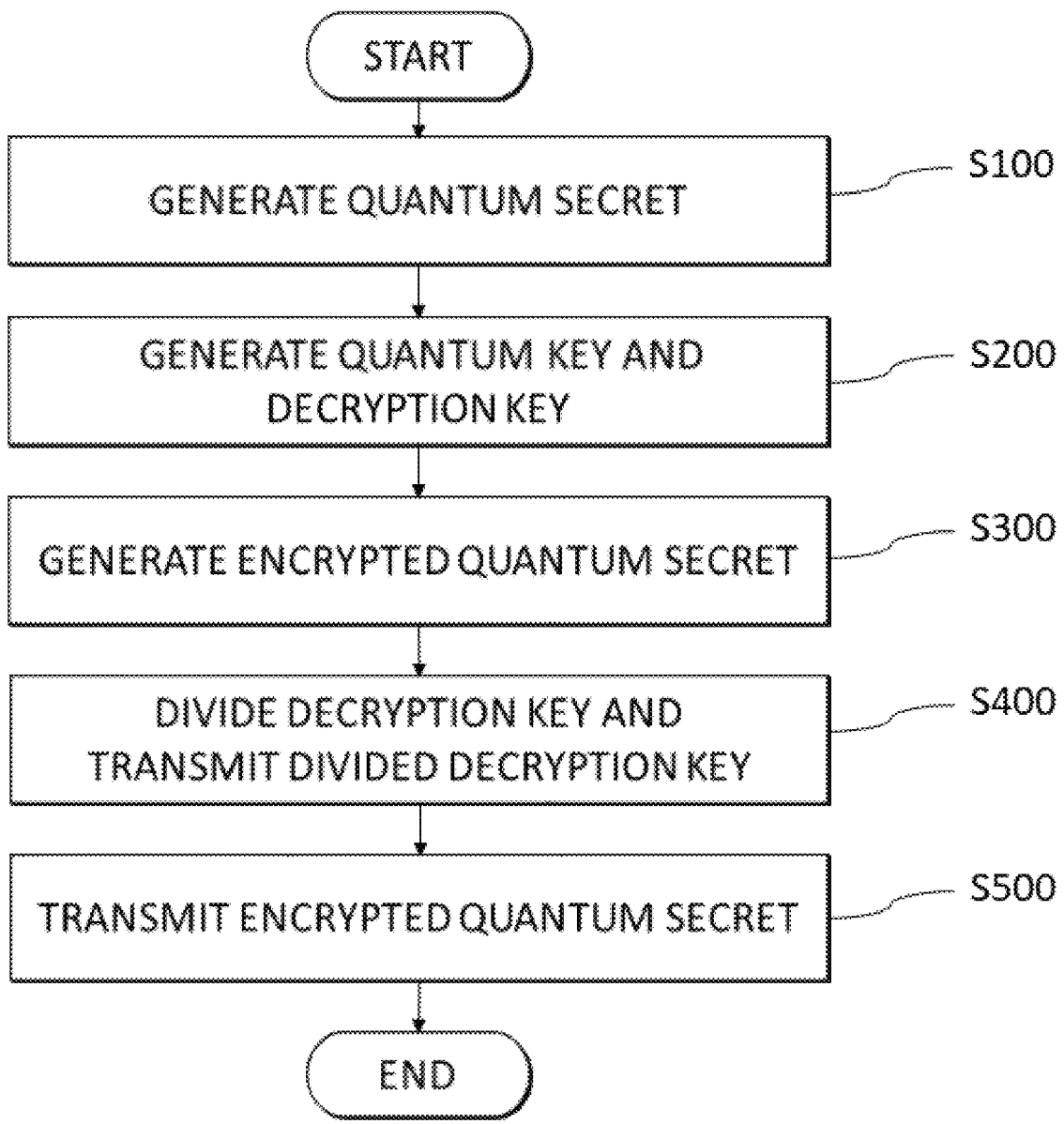
FIG. 14 is a flowchart of a method of sharing a quantum secret according to an exemplary embodiment of the present disclosure.

FIG. 14 is a flowchart of a method of sharing a quantum secret according to an exemplary embodiment of the present disclosure.

Figure 15:
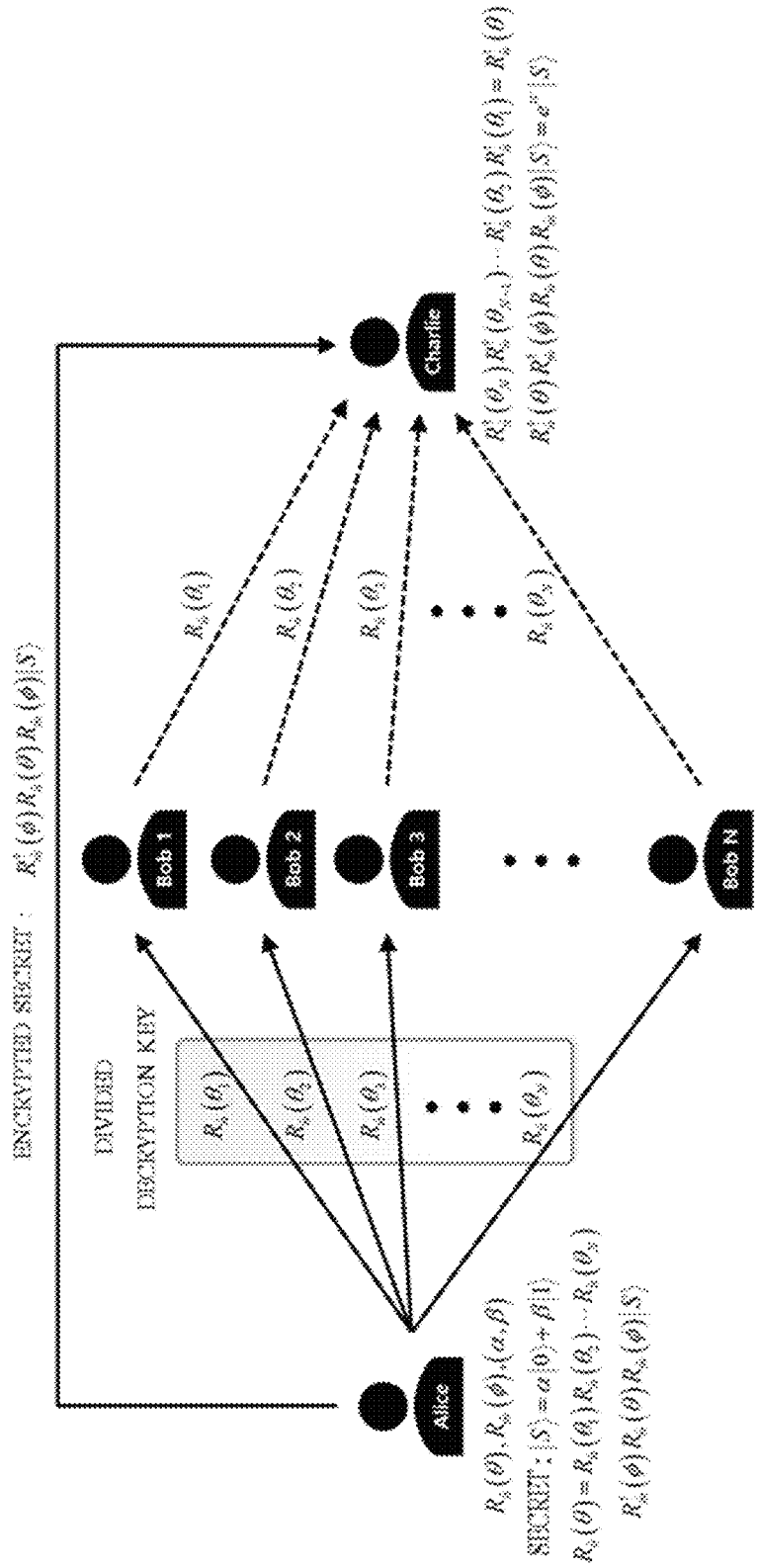
FIG. 15 is a conceptual diagram of a method of sharing a quantum secret according to an exemplary embodiment of the present disclosure.

FIG. 15 is a conceptual diagram of a method of sharing a quantum secret according to an exemplary embodiment of the present disclosure.

Referring to FIGS. 14 and 15, first, the secret generator Alice may generate a quantum secret $$|S\rangle = \cos\left(\frac{\alpha}{2}\right)|0\rangle + e^{i\beta}\sin\left(\frac{\alpha}{2}\right)|1\rangle$$

(Operation S100).

Subsequently, the secret generator Alice may generate an encryption key $R_{\tilde{m}}^\dagger(\varphi) R_{\tilde{n}}(\theta) R_{\tilde{m}}(\varphi)$ and a decryption key $R_{\tilde{n}}^\dagger(\theta)$ by applying operators $R_{\tilde{m}}(\varphi)$ and $R_{\tilde{n}}(\theta)$ to the quantum secret $|S\rangle$ (Operation S200). Here, $R_{\tilde{m}}(\varphi)$ and $R_{\tilde{n}}(\theta)$ may satisfy a cyclic evolution such as $R_{\tilde{n}}^\dagger(\theta) R_{\tilde{m}}^\dagger(\varphi) R_{\tilde{n}}(\theta) R_{\tilde{m}}(\varphi)|S\rangle = e^{i\varepsilon}|S\rangle$.

Subsequently, the secret generator Alice may generate an encrypted quantum secret $|S'\rangle$ from the quantum secret $|S\rangle$ using the encryption key $R_{\tilde{m}}^\dagger(\varphi) R_{\tilde{n}}(\theta) R_{\tilde{m}}(\varphi)$ (Operation S300). More specifically, the encrypted quantum secret satisfies $|S'\rangle = R_{\tilde{m}}^\dagger(\varphi) R_{\tilde{n}}(\theta) R_{\tilde{m}}(\varphi)|S\rangle$.

Subsequently, the secret generator Alice may divide the decryption key $R_{\tilde{n}}^\dagger(\theta)$ into N pieces such as $R_{\tilde{n}}^\dagger(\theta_1) R_{\tilde{n}}^\dagger(\theta_2) \ldots R_{\tilde{n}}^\dagger(\theta_N)$. Then, the secret generator Alice may transmit the divided pieces of decryption key $R_{\tilde{n}}^\dagger(\theta_1) R_{\tilde{n}}^\dagger(\theta_2) \ldots R_{\tilde{n}}^\dagger(\theta_N)$ to the plurality of secret receivers Bob #1 to Bob #N (Operation S400). In this case, the divided pieces of decryption key may be obtained by dividing the whole rotation angle of the decryption key with respect to the same rotation axis.

Subsequently, the secret generator Alice may transmit the encrypted quantum secret $|S'\rangle$ to the secret verifier Charlie (Operation S500). Operation S400 and Operation S500 may be simultaneously performed or may be understood in reverse order.

A subsequent secret restoration process is as follows.

Each of the plurality of secret receivers Bob #1 to Bob #N meets the secret verifier Charlie while carrying a divided piece of decryption key $R_{\tilde{n}}(\theta_i)$ received from the secret generator Alice. The plurality of secret receivers Bob #1 to Bob #N restores the quantum secret $|S\rangle$ by applying the divided piece of decryption key $R_{\tilde{n}}(\theta_i)$ to the encrypted quantum secret $|S'\rangle$ of the secret verifier Charlie. This is represented by Equation 13 below.

$$R_{\tilde{n}}^\dagger(\theta_1) R_{\tilde{n}}^\dagger(\theta_2) \ldots R_{\tilde{n}}^\dagger(\theta_N)|S'\rangle = R_{\tilde{n}}^\dagger(\theta) R_{\tilde{m}}^\dagger(\varphi) R_{\tilde{n}}(\theta) R_{\tilde{m}}(\varphi)|S\rangle = e^{i\varepsilon}|S\rangle \quad \text{[Equation 13]}$$

Meanwhile, in the descriptions of the quantum public-key cryptosystem, the quantum signature method, and the quantum secret sharing method according to exemplary embodiments of the present disclosure, communicators are basically communication devices which are connected to each other through a quantum channel and a public channel. The quantum channel is a communication channel which may transmit and receive photon signals, and the public channel is a communication channel which may transmit and receive electrical signals. In the quantum public-key cryptosystem, the quantum signature method, and the quantum secret sharing method according to exemplary embodiments of the present disclosure, a quantum state which is difficult to store or handle is not used as trap information, and quantum operator information rather than a quantum state is used as trapdoor information. Consequently, it is possible to solve problems that are difficult to solve in existing quantum cryptosystems. The quantum operator information is transmitted and received through the public channel.

According to an aspect of the present disclosure, a public-key cryptosystem may be provided in a quantum communication environment.

According to another aspect of the present disclosure, since quantum operator information rather than a quantum state which is difficult to store or handle is used as trap information, it is possible to ensure quantum stability and provide the same function as a trapdoor one-way function of current cryptography.

According to another aspect of the present disclosure, it is possible to use a single quantum state operator rather than a multidimensional quantum state operator, such as controlled not (CNOT), Quantum Fourier Transform, and Grover Iteration.

Effects of the present disclosure are not limited to those mentioned above, and other effects which have not been mentioned will be clearly understood by those of ordinary skill in the art from the above descriptions.

Although exemplary embodiments of the present disclosure have been described with reference to the accompanying drawings, those of ordinary skill in the art will appreciate that various modifications and equivalents may be made from the exemplary embodiments without departing from the technical spirit or essential characteristics of the present disclosure. Therefore, the above-described embodiments should be construed as illustrative rather than limiting in all aspects.

What is claimed is:

1. A quantum signature method comprising:
   (a) generating, by a transmitter, a quantum message $|M\rangle$;
   (b) generating, by the transmitter, a private key and a public key by using two rotation operators $R_{\hat{n}}(\theta)$ and $R_{\hat{m}}(\varphi)$ satisfying a cyclic evolution;
   (c) generating, by the transmitter, a quantum signature $|S\rangle$ by applying the rotation operators $R_{\hat{n}}(\theta)$ and $R_{\hat{m}}(\varphi)$; and
   (d) transmitting, by the transmitter, a quantum signature pair $|M\rangle \otimes |S\rangle$ including the quantum message $|M\rangle$ and the quantum signature $|S\rangle$ to a receiver.

2. The quantum signature method of claim 1, wherein the two rotation operators $R_{\hat{n}}(\theta)$ and $R_{\hat{m}}(\varphi)$ satisfy neither of the following conditions:

$\theta=2i\pi$, $\varphi=2j\pi$, or $\hat{n}\cdot\hat{m}=1$ ($i,j$=integer), and $\theta=(2k+1)\pi$, $\varphi=(2l+1)\pi$, or $\hat{n}\cdot\hat{m}=0$ ($k,l$=integer).

3. The quantum signature method of claim 1, wherein operation (b) comprises:
   (b-1) generating, by the transmitter, an arbitrary quantum state $|\psi\rangle$ and generating a private key $R_{\hat{n}}(\theta)$ satisfying $|M\rangle = R_{\hat{n}}(\theta)|\psi\rangle$; and
   (b-2) generating, by the transmitter, a public key $R_{\hat{m}}(\varphi)$ satisfying a cyclic evolution.

4. The quantum signature method of claim 3, wherein operation (b) further comprises (b-3) transmitting, by the transmitter, the public key $R_{\hat{m}}(\varphi)$ through a public channel.

5. The quantum signature method of claim 1, wherein the quantum signature $|S\rangle$ is an equation below:

$|S\rangle = R_{\hat{n}}(\theta)R_{\hat{m}}(\varphi)|\psi\rangle$.

6. The quantum signature method of claim 1, further comprising (e) verifying, by the receiver, the quantum signature $|S\rangle$ by applying a public key $R_{\hat{m}}^{\dagger}(\varphi)$ to the quantum signature pair $|M\rangle \otimes |S\rangle$ received from the transmitter as shown in an equation below:

$|\langle M|R_{\hat{m}}^{\dagger}(\varphi)|S\rangle| = |\langle\psi|R_{\hat{n}}^{\dagger}(\theta)R_{\hat{m}}^{\dagger}(\varphi)R_{\hat{n}}(\theta)R_{\hat{m}}(\varphi)|\psi\rangle| = |\langle\psi|e^{i\varepsilon}|\psi\rangle| = |e^{i\varepsilon}||\langle\psi|\psi\rangle| = 1$.

* * * * *